United States Patent
Roberts et al.

(10) Patent No.: US 8,185,939 B2
(45) Date of Patent: May 22, 2012

(54) LOGIN CONTROL FOR MULTIPLE APPLICATIONS

(75) Inventors: Howard Roberts, Ruislip (GB); Benjamin John Parks, Reading (GB)

(73) Assignee: Canon Europe Limited, Amstelveen (NL)

( * ) Notice: Subject to any disclaimer, the term of this patent is extended or adjusted under 35 U.S.C. 154(b) by 1152 days.

(21) Appl. No.: 11/537,279

(22) Filed: Sep. 29, 2006

(65) Prior Publication Data

US 2007/0079360 A1  Apr. 5, 2007

(30) Foreign Application Priority Data

Oct. 4, 2005 (GB) .................................. 0520202.3

(51) Int. Cl.
*G06F 21/00* (2006.01)
(52) U.S. Cl. ............................................. 726/8; 726/19
(58) Field of Classification Search .................. 726/5, 6, 726/8, 18, 19, 21, 28, 29, 30; 713/159, 168, 713/172, 183, 185

See application file for complete search history.

(56) References Cited

U.S. PATENT DOCUMENTS

| 6,826,696 B1 * | 11/2004 | Chawla et al. ..................... 726/4 |
| 2003/0033535 A1 * | 2/2003 | Fisher et al. ................... 713/185 |
| 2005/0071645 A1 | 3/2005 | Girouard et al. |
| 2006/0077429 A1 * | 4/2006 | Zhang et al. ................. 358/1.15 |

FOREIGN PATENT DOCUMENTS

| WO | 0155819 A1 | 8/2001 |
| WO | 0155822 A1 | 8/2001 |

* cited by examiner

*Primary Examiner* — Gilberto Barron, Jr.
*Assistant Examiner* — Izunna Okeke
(74) *Attorney, Agent, or Firm* — Canon U.S.A., Inc. IP Division (57) ABSTRACT

A method of controlling login requirements of a plurality of peripheral device applications includes defining one of the peripheral device applications as a master application, with all other peripheral device applications being slave applications, enabling the master application to obtain login information from an operator, and enabling at least one of the slave applications to seek login information from the master application and, if the login information is not available for the slave application, enabling the slave application to obtain login information under the control of the master application by executing a slave login process.

13 Claims, 5 Drawing Sheets

LOGIN CONTROL FOR MULTIPLE APPLICATIONS

CROSS REFERENCE TO RELATED APPLICATIONS

This application claims priority from European Patent Application No. GB0520202.3 filed Oct. 4, 2005, which is hereby incorporated by reference herein in its entirety.

BACKGROUND OF THE INVENTION

1. Field of the Invention

This invention relates to login control for peripheral devices having multiple applications, at least some of which require an operator to login. For example, a peripheral device may include printer, scanner and photocopier applications each having login requirements.

2. Description of the Related Art

Traditional office photocopiers, scanners and printers have developed considerably in recent years. Typically, scanners, printers and photocopiers were separate, stand-alone devices. Multi-purpose devices, termed Multi-Functional Products (MFPs), have been developed in recent times that are typically able to print, scan and photocopy documents as well as transfer files, such as scanned images, over a network.

Figure 1:
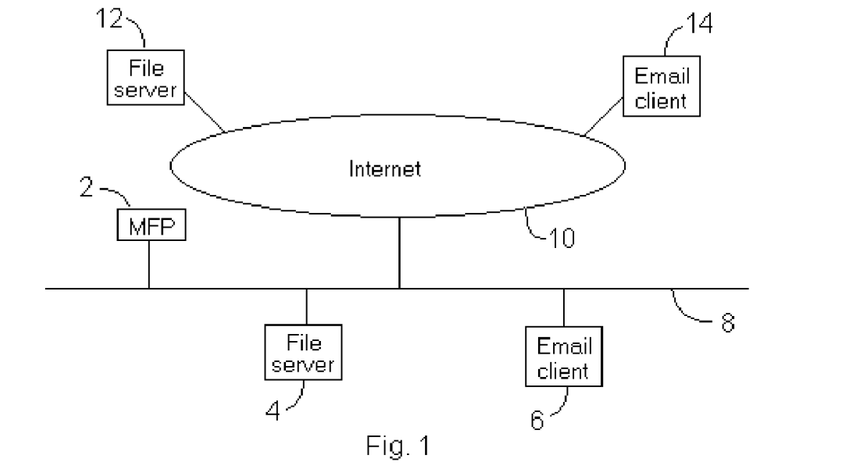
FIG. 1 shows a network consisting of an MFP used in accordance with the present invention.

FIG. 1 shows a network consisting of an MFP 2 connected to a file server 4 and an E-Mail client 6 over a local area network (LAN) 8. LAN 8 is also connected to the Internet 10. In addition to being connected to local file server 4 and local Email client 6 via LAN 8, MFP 2 is also connected to remote file server 12 and remote Email client 14 via the Internet 10. Documents can be sent over a network consisting of LAN 8 or LAN 8 and the Internet 10 to MFP 2 for printing: similarly, scanned files can be transmitted from MFP 2 over such networks.

It is known to provide login arrangements for a wide range of applications. For example, users of computer workstations are used to being required to login by entering their username and password. These are transmitted to and checked by a security program and if they are correct the user is logged on. This kind of logging in is often referred to as "logging on to the network".

In relation to multi-functional products of the form described above, it is known to provide login arrangements to restrict access to unauthorised users and to monitor the usage of the devices for charging purposes. This may be used in a shared office environment to reduce the risk of confidential information being seen by unauthorised individuals, or to provide a means for charging for resources on the basis of use.

Canon Inc. provides a wide range of MFPs that are compatible with the present invention. Many of these MFPs include a Multifunctional Embedded Application Platform (MEAP) as is known in the art. The MEAP platform allows applications written in a Java-type language to be installed and run on the MFP (these are known as MEAP applications). These applications can then control the operation of the MFP and can display user information and receive user input from an operator, typically via a touch sensitive screen. Of course, other forms of embedded software application environments for an MFP could be used.

There are many known login arrangements that can readily be incorporated into MFPs and the like. These include:
Username and/or password.
PIN code.
Magnetic cards used in conjunction with a card reader.
Proximity cards which do not require the user to pass the card through a card reader.

Figure 2:
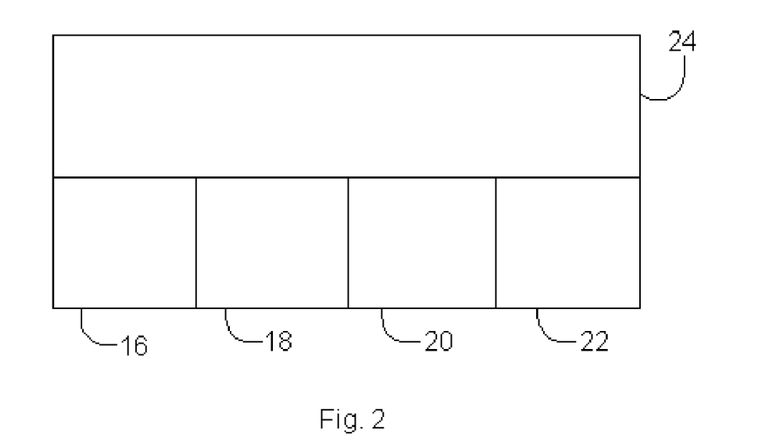
FIG. 2 shows a first known login arrangement.

FIG. 2 shows a first approach for providing a login arrangement for a multi-functional product (MFP). The arrangement shown in FIG. 2 includes first 16, second 18, third 20 and fourth 22 applications. Those applications may, for example, implement printing, scanning, faxing and mailbox functions, respectively, and may be MEAP applications.

In addition to standard functions available with MFPs, custom applications can readily be designed (for example by writing new MEAP applications). For example, the inventors are aware of a number of such applications, including, by way of example:

An application in which a print job is held at an MFP until an operator's identity has been verified at the device itself, thereby increasing the security of printing confidential information.

A queue management arrangement so that jobs can be printed out in a particular order, for example in order of urgency.

Accounting systems to determine the amount of usage of particular functions, for charging purposes.

Overlaying the applications 16 to 22 is a login application 24. In the structure of FIG. 2, in order to gain access to any of the applications 16 to 22, a user must be logged in via the login application 24. Once the user is so logged in, then he/she has full access to each of the applications 16 to 22.

Figure 3:
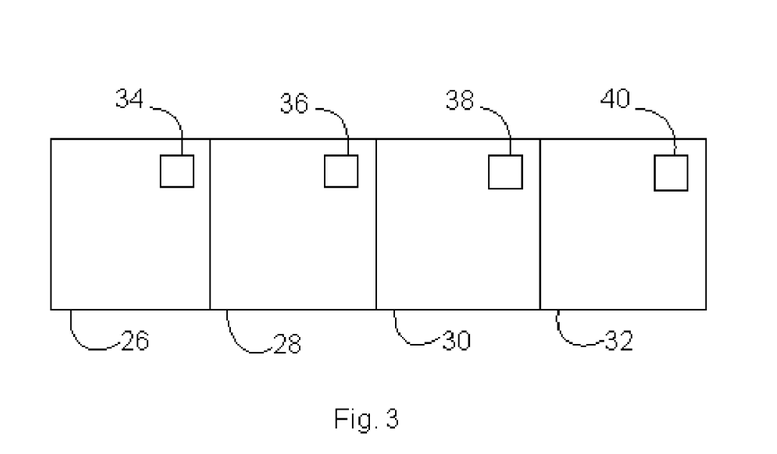
FIG. 3 shows a second known login arrangement.

FIG. 3 shows a second approach for providing a login arrangement for an MFP. In the arrangement of FIG. 3, first 26, second, 28, third 30 and fourth 32 applications are provided. The arrangements 26 to 32 could, for example, implement printing, scanning, faxing and mailbox functions, respectively. Application 26 is provided with login arrangement 34. In a similar manner, applications 28, 30 and 32 are provided with login arrangements 36, 38 and 40, respectively.

In the structure of FIG. 3, in order to gain access to any of the applications 26 to 32, the operator needs to login via the login arrangement associated with the application concerned.

Figure 4:
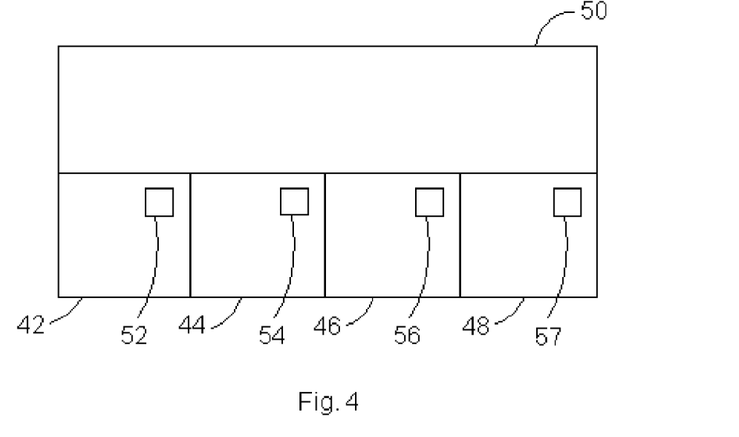
FIG. 4 shows a third known login arrangement.

FIG. 4 shows a third approach for providing a login arrangement for an MFP that combines features of the first and second arrangements described above. In the arrangement of FIG. 4, first 42, second 44, third 46 and fourth 48 applications are provided. The arrangements 42 to 48 could, for example, implement printing, scanning, faxing and mailbox functions, respectively. Overlaying the applications 42 to 48 is a login application 50.

In the structure of FIG. 4, in order to gain access to any of the applications 42 to 48, a user must be logged in via the login application 50. In addition, applications 42, 44, 46 and 48 are provided with login arrangements 52, 54, 56 and 57, respectively. In the example of FIG. 4, in order to gain access to any of the applications 42 to 48, the operator needs to login via the login arrangement associated with the application concerned. It should be noted that it is not essential to provide each of the applications 42 to 48 with its own login arrangement. For example, the login arrangement 57 may be omitted. In such an arrangement, in order to login to application 46 it would be necessary to login via the login arrangement 50 and the login arrangement 56, but in order to login to the application 48 it would only be necessary to login via the login arrangement 50.

Consider the following scenario, described with relation to the arrangement of FIG. 1. An operator wishes to send a set of documents to an MFP for printing. This is done, in this exemplary scenario, in the form of an email, which is sent to the email address of the MFP from the local email client 6, making use of the mailbox function of the MFP. That same operator also wishes to scan a document using the scanner function of the MFP and store those documents on the remote file server 12. The mailbox and scanning functions of the MFP each require the operator to login before they can be carried out.

Consider first the login arrangement of FIG. 2. The operator simply logs in via the login arrangement 24. (The means by which the operator logs in could take one of many forms, as discussed elsewhere in this specification.) The operator then has complete access to both the mailbox function and the scanning function. It is not possible to provide separate login requirements for the printer and the scanner using the arrangement of FIG. 2.

Consider the second login arrangement of FIG. 3. In order to access the mailbox function, the user needs to log in to that function. Once the documents sent to the mailbox have been printed, the operator must login to the scanning function in order to carry out the scanning of the documents.

Consider the third login arrangement of FIG. 4. In order to access either the mailbox function or the scanning function, the operator must first login via the login arrangement 50. Then, in order to access the mailbox function, the operator must login to that function. After that, in order to login to the scanning function, the operator must separately login to that function.

The first login arrangement of FIG. 2 has the advantage that it is simple, but it lacks flexibility. Only one login procedure is required, which would be popular with operators. However, it is not possible to allow an operator to access some applications without a password, whilst still protecting others with login requirements. Further, as noted above, it is not possible to provide different login requirements for different applications. A further potential problem is that an individual operator may log in when the MFP is first powered up and remain logged in, leaving other operators free access to the device.

The second login arrangement provides flexibility regarding the applications that require a login procedure, but is likely to lead to an operator logging in repeatedly, possibly using different login procedures required by different application developers.

The third login arrangement provides yet further flexibility from an application developer's point of view but further complicates the operation of the device from an operator's point of view.

The goals of flexibility for the application developer in terms of defining the login requirements and ease of use for the operator are contradictory in the known login arrangements described above. A further problem with some existing solutions is that the login procedure is separately designed for each application, increasing development time and resulting in applications having quite different functionalities.

SUMMARY OF THE INVENTION

The present invention seeks to overcome or address one or more of the problems identified above.

According to an aspect of the present invention, a method of controlling login requirements of a plurality of peripheral device applications includes: defining one of the applications as a master application, with all other applications being slave applications; enabling the master application to obtain login information from an operator; and enabling one or more of the slave applications to seek login details from the master application and, if the login information is not available for a particular application, enabling the slave application to obtain login information under the control of the master application by executing a slave login process.

According to another aspect of the present invention, a software application for controlling login requirements of a plurality of peripheral device applications, the software application being arranged, when executed on the peripheral device, includes: defining one of the applications as a master application, with all other applications being slave applications; enabling the master application to obtain login information from an operator; and enabling at least one of the slave applications to seek login information from the master application when required and, if the login information is not available for a particular slave application, enabling the slave application to obtain login information under the control of the master application by executing a slave login process.

According to yet a further aspect of the present invention, a peripheral device including a plurality of applications requiring login information from an operator includes: a defining unit configured to define one of the applications as a master application, with all other applications being slave applications; a master application login information obtaining unit configured for the master application to obtain login information from an operator; a login information seeking unit configured for a slave application to seek login information from the master application; and a slave application login information obtaining unit configured for a slave application to obtain login information under the control of the master application.

DETAILED DESCRIPTION OF THE EMBODIMENTS

In one form of the invention, the step of enabling one or more of the slave applications to seek login information from the master application includes enabling each of the slave applications to seek the login information.

The login process may obtain a login user interface from the master application. This has the advantage that the user interfaces presented to an operator when logging in to various application can be made uniform. A further advantage is that applications can be provided without user interface details for login purposes, and simply make use of the user interface provided by the master application, thus reducing application development time.

The login data obtained from the operator during the slave login process may be verified by the master application. This has the advantage that an application can be provided without the ability to process login information, since it can take advantage of the functionality of the master application, thus reducing application development time.

In exemplary embodiments of the invention, if an operator wishing to log in to a slave application has previously logged in via the master application, login information is sent by the master application to the slave application. This process removes the need for an operator to repeat login steps when he/she wishes to use a new application requiring login details. The process can also be entirely hidden from the user.

In exemplary embodiments of the invention, when an operator successfully logs in, the master application creates a login context object describing the login information of the operator. In exemplary embodiments of the invention, a login context object is a file including details of a person who has logged in. The master application, on receiving a login request from a slave application, may send a login context object to the slave application. Since the login context object describes the login information, the slave application can use the login context object to log the operator concerned into the slave application. This process can be entirely hidden from the operator.

In exemplary embodiments of the invention, the master application issues a login event when an operator successfully logs in. A slave application, on receiving a login event, may request login information from the master application. As noted above, the login information, for example in the form of a login context object, can be used to log an operator into a slave application. Thus, in exemplary embodiments of the invention, the master application issues a login event when an operator successfully logs in, in response to which a slave application requests login information from the master application, in response to which the master application sends the appropriate login context object to the slave application. These processes can be entirely hidden from the operator.

In exemplary embodiments of the invention, whenever an application starts the application requests permission to become the master application. Alternatively, whenever an application that has the ability to be a master application starts, it requests permission to become the master application, thus enabling some applications to be provided with reduced functionality and to make use of the additional functionality of a master application, for example for obtaining login user interfaces and for authenticating operators attempting to login.

In exemplary embodiments of the invention, a request to become the master application is granted if, and only if, a master application does not currently exist.

Alternatively, a particular application may be permanently defined as the master application.

In exemplary embodiments of the invention, when an operator logs out of a slave application, that slave application informs the master application. In exemplary embodiments of the invention, the master application is arranged to inform slave applications that an operator has logged out.

There are many known login arrangements that can readily be used with the present invention. These include, but are not limited to: entering a username and/or password; entering a PIN code; using magnetic cards in conjunction with a card reader; and using proximity cards which do not require the user to pass the card through a card reader.

In exemplary embodiments of the invention, the peripheral device applications include applications controlling the printing of documents. Many other peripheral applications can be used with the invention, such as applications for controlling scanning, mailbox and charging functions. The invention is also suitable for use with many other applications not specifically mentioned here.

In exemplary embodiments of the invention, the peripheral device is a multi-functional product.

Figure 5:
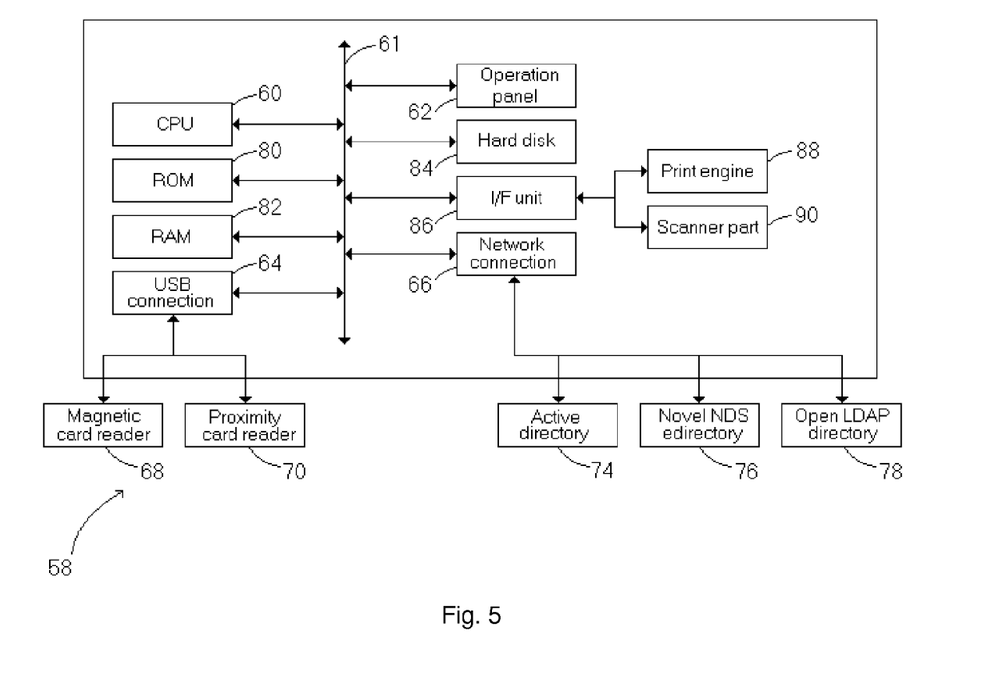
FIG. 5 shows an MFP including features of the present invention.

Exemplary embodiments of the invention will now be described with reference to the accompanying drawings of which FIG. 5 illustrates exemplary aspects of a multi-functional product (MFP) 58.

The MFP 58 includes a CPU 60 connected to a system bus 61. The CPU 60 integrally controls each of the devices connected to the system bus 61.

Figure 11:
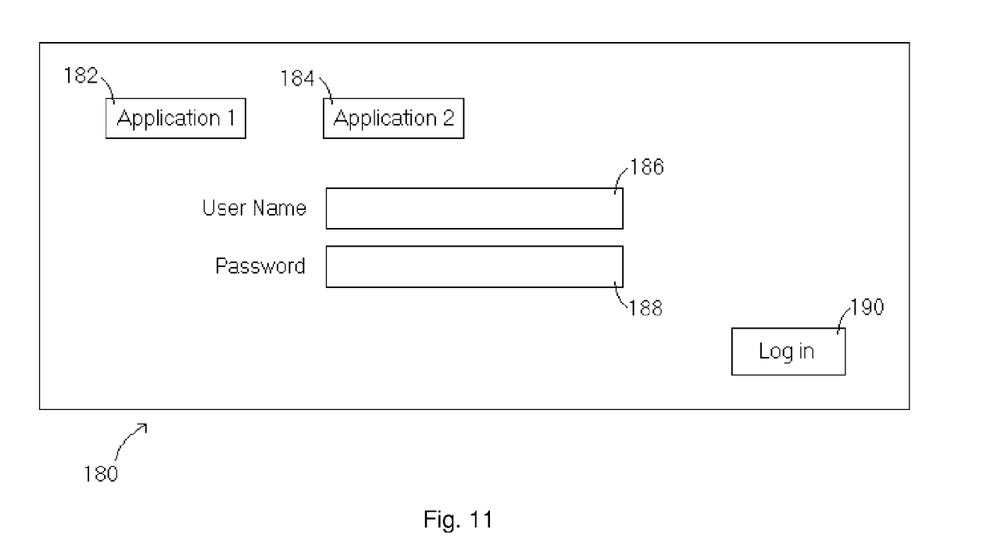
FIG. 11 shows an exemplary login screen used in embodiments of the present invention.

The MFP 58 includes an operations panel 62, a magnetic card reader 68, and a proximity card reader 70 for inputting identity-related data. The operations panel 62 enables the display of information to, and receipt of input from, an operator, for example via a touch sensitive screen; such a screen is shown in FIG. 11 described further below. The magnetic card reader 68 and the proximity card reader 70 are external to the MFP 58 and are arranged to communicate with the MFP 58 via a USB connection 64. The MFP 58 is also connected to databases that can be used to validate identity-related data, for example, an Active directory 74, a Novel NDS eDirectory 76, and an Open LDAP Directory 78, via a network connection 66. The USB connection 64 and the network connection 66 are both connected to the system bus 61.

The MFP also includes a read only memory (ROM) 80, random access memory (RAM) 82, hard disk 84 and interface unit 86, each of which are connected to the system bus 61. In addition, a print engine 88 and scanner part 90 are provided and are connected to the interface unit 86.

During printing, the CPU 60 outputs an image signal as output information to the print engine 88 via the system bus 61 and the interface unit 86. This process is controlled by a control program stored in either the ROM 80 or the hard disk 84. The ROM 80 also stores information to be used in cases where the MFP does not have a hard disk.

RAM 82 functions, inter alia, as a main memory and a work area of the CPU 60. The interface unit 86 control documents to be printed by the printer 88 and documents scanned by the scanner 90.

In addition to the printing and scanning functions described above, the MFP 58 may implement a number of other features such as mailbox control and accounting processes, as described above with reference to FIGS. 2 to 4. Those applications could include one or more MEAP applications or other forms of embedded software applications.

Typically, such processes are provided as software applications stored by the hard disk 84. When required for use, the processes stored on the hard disk 84 may be uploaded to the RAM 82 for execution by the CPU 60. Alternatively, such processes could be stored by the ROM 80.

It should be noted that the various means for providing identity-related data and for verifying such data described with reference to FIG. 5 are exemplary. Not all need to be provided in every embodiment of the invention and further or alternative means for providing identity-related data may be provided.

Furthermore, it should be noted that the skilled person will be aware of many schemes for connecting a variety of means for providing identity-related data to an MFP as well as a variety of means for verifying that data. Accordingly, no further details will be given here.

In exemplary embodiments of the invention, the magnetic card reader 68 is a Cartardis TC4N device available from Copie Monnaie France CARTARDIS, 1, avenue Louison Bobet, Zone des Marais, 94120 Fontenay-Sous-Bois, France and the proximity card reader 70 is a Cardman Mifare reader available from Omnikey GmbH, Am Klingenweg 6a, 65396 Walluf, Germany. The skilled person would be aware of many alternative devices that could be used.

As described above with reference to FIGS. 2 to 4, it may be desirable to control and monitor access to MFP applications. The arrangement of FIG. 5 provides a number of means for controlling and monitoring access, as described below.

The arrangement of the present invention takes the structure of either FIG. 3 or FIG. 4, and adapts it by designating one of the applications as being a master application, with all other applications being slave applications. The master application controls login functions and, as described below, slave applications make use of the login functionality of the master application.

A master application is simply an application that exports login functionality to other devices. It is the use of the master application's resources that creates the master/slave relationship between the applications.

Figure 6:
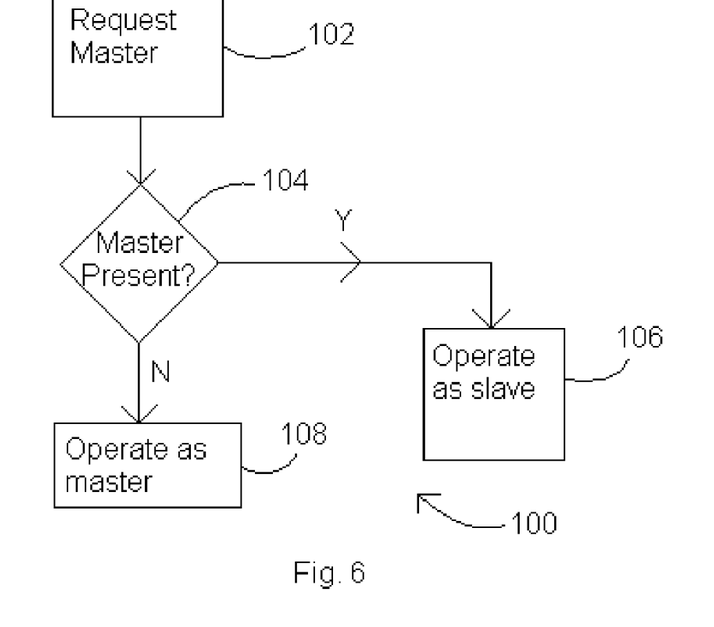
FIG. 6 is a flow chart showing an exemplary master registration process in accordance with an aspect of the present invention.

In many arrangements in accordance with the present invention, any one of the applications could be the master. In such circumstances, a method is required for deciding which application is to be the master. FIG. 6 is a flow chart showing an exemplary process, indicated generally by the reference numeral 100, used for setting the master application. The process essentially requires that the first suitable application that requests mastery of the system is the master.

As shown in FIG. 6, at step 102, an application requests mastery. If a master has already been set (YES in step 104), then the request is refused and the application proceeds as a slave application (step 106). If no master has been set (NO in step 104), then that application operates as the master (step 108). In exemplary embodiments of the invention, when the application becomes the master application, it takes control of a USB interface of the MFP. By taking control of the USB interface, the master application can communicate with USB devices, such as the magnetic card reader 68 and the proximity card reader 70 described above.

Figure 7:
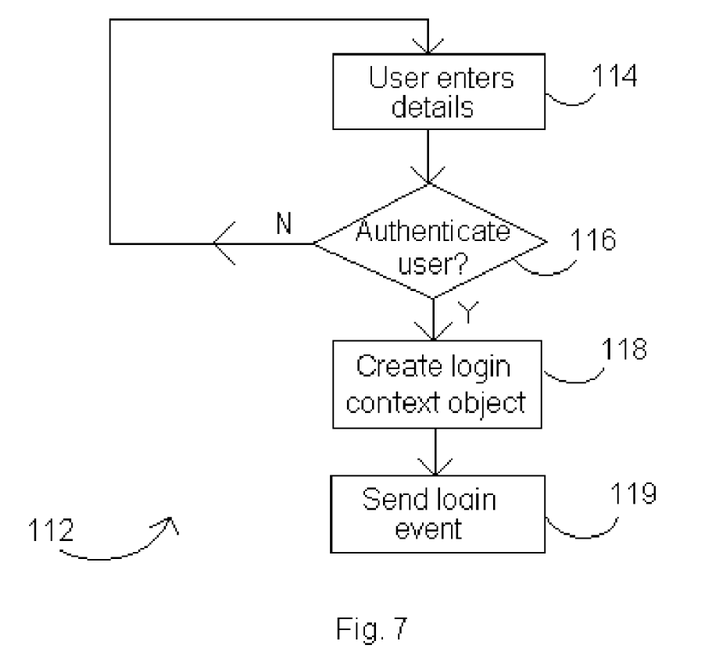
FIG. 7 is a flow chart showing an exemplary master login process in accordance with an aspect of the present invention.

Should an operator wish to make use of the master application, then that master is able to execute a login process itself. Such a process, indicated generally by the reference numeral 112, is shown in FIG. 7.

The process 112 starts at step 114 at which point user details are entered. This step may take many forms. For example, the user may enter a username and/or a password, the user may pass a magnetic identity card through the magnetic card reader 68, etc. An exemplary login screen, which requires an operator to enter a username and password is shown in FIG. 11, described further below.

Regardless of the nature of entering the user details, those details are authenticated at step 116, for example by checking a user's password in a database. The skilled person will be aware of many schemes for carrying out this function. Accordingly, no further details will be given here. If the user is authenticated (YES in step 116), the process 112 moves to step 118, otherwise the process returns to step 114 and the user is asked to enter details again.

At step 118, an object (known as a login context object) is created containing the user details. The login context object is a file including details of the person who has logged in. As described below, when that user wishes to access a slave application, the login context object can be sent to the slave application in order for that operator to be logged into the slave application. The process will be hidden from the operator. Thus, the operator will only notice that he/she has access to the slave application(s) without needing to re-enter login details.

After creating the login context object, the process moves to step 119, where a login event is sent. The login event is sent by the master application to inform slave applications that an operator has logged into the master application. In response to a login event, a slave application may execute a receive login event process, described below, in order to log that operator into the slave application. As with the login context described above, this arrangement will be hidden from the operator. Thus, the operator will only notice that he/she has access to the relevant slave application(s) without needing to re-enter login details.

The process 112 terminates once the login event has been sent (step 119).

It should be noted that the step of creating a login context object and/or the step of sending a login event may be omitted from embodiments of this invention.

Figure 8:
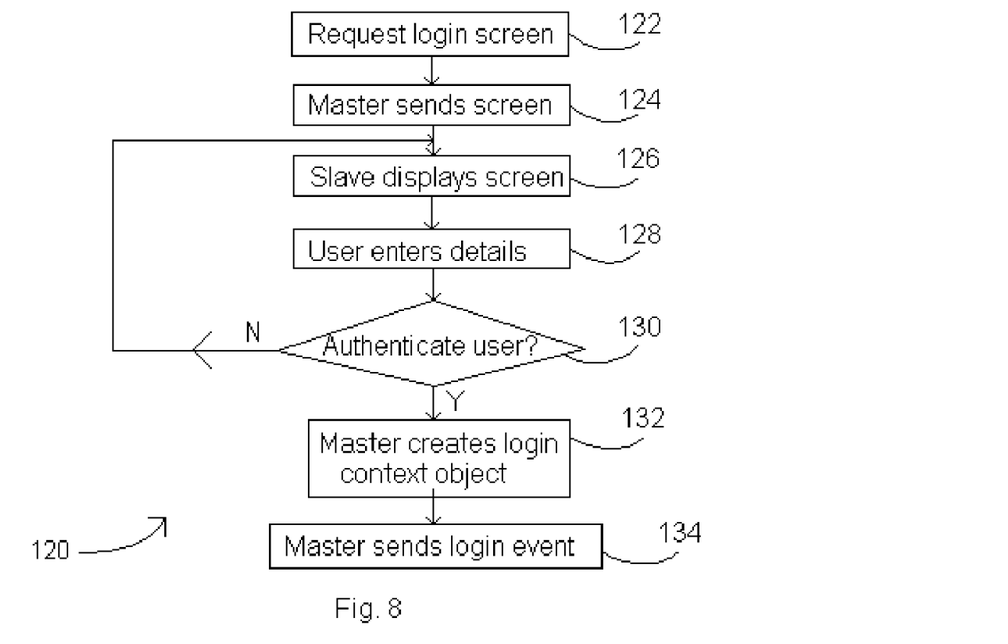
FIG. 8 is a flow chart showing an exemplary slave login process in accordance with an aspect of the present invention.

The process 112 describes an exemplary way that an operator can gain access to the master application. FIG. 8 shows an exemplary process, indicated generally by the reference numeral 120, which shows how an operator gains access to a slave application.

The process 120 starts at step 122, which requests that the master application provide a login screen for display by the slave application. This screen is provided by the master application at step 124 before being displayed by the slave application at step 126.

After the login screen has been displayed, the process 120 moves to step 128 at which point the user enters login details in the same manner as described above with reference to process 112 shown in FIG. 7 and described above. The operator details are authenticated by the master application at step 130. If the operator is not authenticated (NO in step 130), the process returns to step 126, otherwise, if the operator is authenticated (YES in step 130) the process proceeds to step 132. At step 132, the master application creates a login context object before proceeding to step 134 where a login event is sent.

The process 120 terminates once the step 134 has been executed.

It should be noted that the step of creating a login context object and/or the step of sending a login event may be omitted from embodiments of this invention.

The processes described above with reference to FIGS. 6 to 8 show how a master application is set and how master and slave login procedures are executed. Those processes are software applications (e.g. MEAP applications) stored by the hard disk 84 described above with reference to FIG. 5. The processes could be executed directly from the hard disk 84. Alternatively, the processes, when required, are uploaded to the RAM 82 before being executed by the CPU 60.

Figure 9:
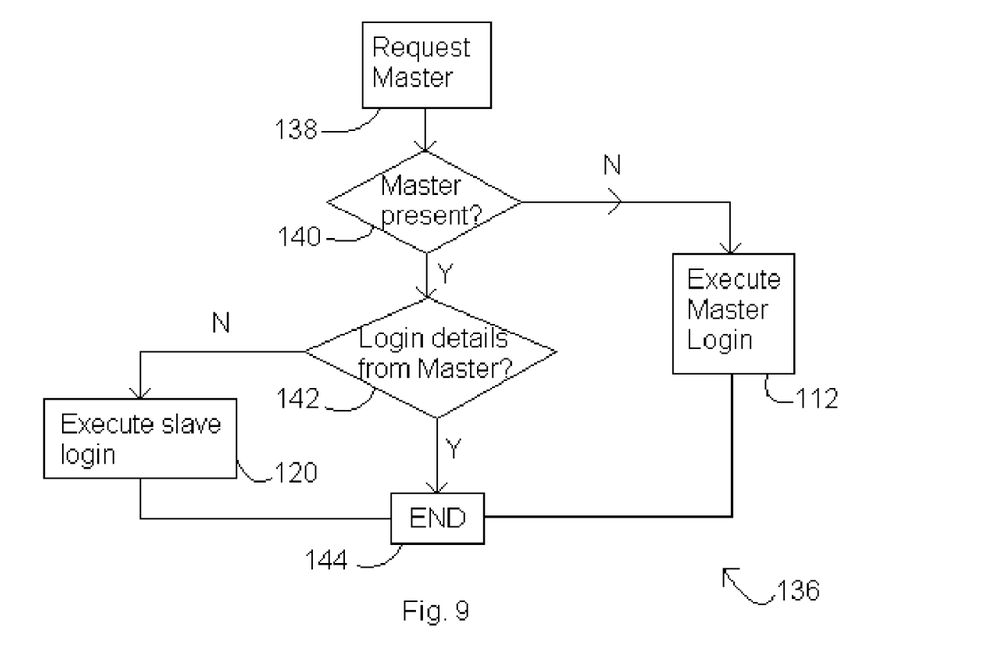
FIG. 9 is a flow chart showing an exemplary login process in accordance with an aspect of the present invention.
Figure 10:
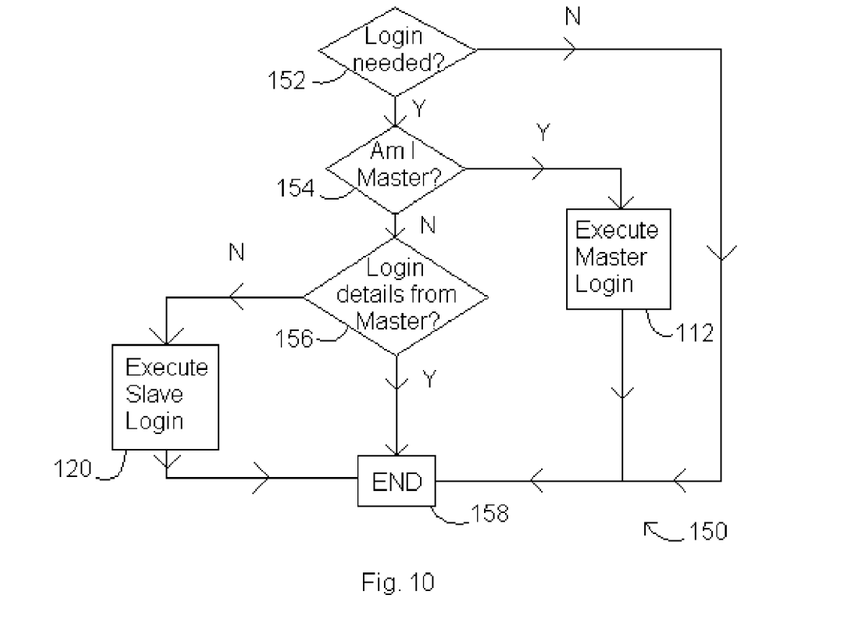
FIG. 10 is a flow chart showing an exemplary login process in accordance with an aspect of the present invention.

FIGS. 9 and 10 illustrate exemplary processes showing the functionality of an overall login application, making use of the processes 100, 112 and 120 described above with reference to FIGS. 6 to 8.

FIG. 9 shows a process, indicated generally by the reference numeral 136, that is executed when an application that requires login information is started. Such an application may be started, for example, when an operator selects an application button on a user interface of an MFP, or when a login event is received from the master.

The process 136 starts at step 138, in which the application concerned asks to be the master application. The process then moves to step 140, which determines whether a master application has been set. If it is determined that a master has already been set (YES in step 140), then the process moves to step 142 (and the application proceeds as a slave application). If it is determined that no master has been set (NO in step S140), then the process moves to step 112 (and the application proceeds as the master application). Thus, steps 138 and 140 are essentially steps 102 and 104 of the master registration process of FIG. 6.

At step 112, the master application executes the master login process described above with reference to FIG. 7. Once the login is completed, the process 136 terminates at step 144.

At step 142, the slave application determines whether login details are available from the master application. If it is determined that the login details are available from the master application (e.g. in the form of a login context object) (YES at step 142), that information is obtained and the process 136 terminates at step 144. This, will almost certainly be the outcome if the process 136 is executed as a result of receiving a login event from the master application.

If it is determined that the login details are not available from the master application (NO at step 142), the process proceeds to step 120. At step 120, the slave application executes the slave login process described above with reference to FIG. 8. Once the slave login has been executed, the process 136 terminates at step 144.

Thus, the application obtains login information in one of three ways: either by registering as the master application and executing a master login process (step 112), by obtaining a login context object from the master (step 142), or by executing a slave login process (step 120). In any event, the process proceeds to step 144 where the process terminates.

The processes described above generally assume that any one of the applications may become a master. This is not essential. In exemplary embodiments of the invention, only one application can be the master. This may be because only one application has the functionality required to provide the login functions, or it may be due to the structure of the applications.

Consider the structure of FIG. 2. The login application 24 could function as a master as described above, with the applications 16, 18, 20 and 22 acting as slave applications. In such an arrangement, each of the applications 16, 18, 20 and 22 would be prevented from becoming the master. In such an arrangement, the various process steps described above where mastery is requested could be omitted.

FIG. 10 shows an exemplary process, indicated generally by the reference numeral 150 that is executed when an application is started in an arrangement where the master application is predetermined. Such an application may be started, for example, when an operator selects an application button on a user interface of an MFP, or when a login event is received from the master.

The process 150 starts at step 152, in which the application concerned asks whether login is required. If login is required (YES in step 152), the process 150 proceeds to step 154, otherwise the process proceeds to step 158 where the process 150 ends.

At step 154, the application determines whether or not it is the master application. If it is determined that the application is the master application (YES at step 154), the process proceeds to step 112, where the master login process described above with reference to FIG. 7 is executed and the process then proceeds to step 158 and ends. If it is determined that the application concerned is not the master application (NO at step 154), then the process 150 proceeds to step 156.

At step 156, the slave application determines whether login details are available from the master application. If the login details are available from the master application (e.g. in the form of a login context object) (YES at step 156), that information is obtained and the process 156 proceeds to step 158 and ends.

If the login details are not available from the master application (NO at step 156), the process proceeds to step 120. At step 120, the slave application executes the slave login process described above with reference to FIG. 8 before proceeding to step 158 where the process ends.

Thus, the application obtains login information in one of three ways: either by registering as the master application and executing a master login process (step 112), by obtaining a login context object from the master (step 156), or by executing a slave login process (step 120). In any event, the process proceeds to step 158 where the process terminates.

As with the processes 100, 112 and 120 described with reference to FIGS. 6 to 8, the processes 136 and 150 are software applications (e.g. MEAP applications) stored by the hard disk 84 described above with reference to FIG. 5. The processes could be executed directly from the hard disk 84, but in exemplary embodiments of the invention, the processes, when required, are uploaded to the RAM 82 before being executed by the CPU 60.

Alternatively, some, but not all, of the applications can become master. For example, this could be because only some of the applications have the required functionality to act as master.

FIG. 11 shows an exemplary login screen, indicated generally by the reference numeral 180, used in embodiments of the present invention. The login screen may be displayed on the operations panel 62 described above with reference to FIG. 5. The exemplary login screen 180 includes two application buttons 182 and 184 that are included on a touch sensitive screen. In order to access an application, the operator simply selects the application, for example by pressing on the appropriate part of the touch sensitive screen.

The login screen 180 also includes a user name box 186 and a password box 188. In order to login, the user simply enters a user name and password, using a keyboard or other similar device in a manner well known to the person skilled in the art. When the login information has been entered, the user selects the login button 190, for example by pressing on the appropriate part of the touch sensitive screen.

The software required to present the login screen 180 and to process the results is executed by the CPU 60. That software may be stored on the hard disk 84. Of course, as described with reference to FIG. 5, entering user name and password details is only one of many login schemes that may be used with the present invention.

In exemplary embodiments of the invention, when an operator logs out of a slave application, that slave application informs the master application. The master application is arranged to inform slave applications that an operator has logged out, for example by sending a logout event, similar to the login event described above, and by sending logout context objects to slave applications, similar to the login context objects described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:
1. A method of controlling a peripheral device to establish login requirements of a plurality of peripheral device applications, the method comprising:
defining one of the peripheral device applications as a master application, with all other peripheral device applications being slave applications;

enabling the master application to obtain login information from an operator; and enabling at least one of the slave applications to seek login information from the master application and, if the login information is not available for a particular slave application, enabling the particular slave application to obtain login information under control of the master application by executing a slave login process, wherein, during the slave login process, the master application provides a login screen for display by the slave application.

2. A method as claimed in claim 1, wherein, during the slave login process, the slave application requests the login screen from the master application.

3. A method as claimed in claim 1, wherein login data obtained from the operator during the execution of the slave login process is verified by the master application.

4. A method as claimed in claim 1, wherein, if an operator wishing to login to a slave application has previously logged in via the master application, login information is sent by the master application to the slave application.

5. A method as claimed in claim 1, wherein, when an operator successfully logs in, the master application creates a login context object describing the login information of the operator.

6. A method as claimed in claim 5, wherein the master application, on receiving a login request from a slave application, sends the login context object to the slave application.

7. A method as claimed in claim 1, wherein the master application issues a login event when an operator successfully logs in.

8. A method as claimed in claim 7, wherein a slave application, on receiving a login event, requests login information from the master application.

9. A method as claimed in claim 1, wherein on starting, an application requests permission to become the master application.

10. A method as claimed in claim 1, wherein a pre-determined application is defined as the master application.

11. A method as claimed in claim 1, wherein the peripheral device applications include applications controlling printing of documents.

12. A non-transitory computer-readable medium storing thereon a software application for controlling login requirements of a plurality of peripheral device applications, when executed on a peripheral device, the software application executes instructions for:

defining one of the applications as a master application, with all other applications being slave applications;

enabling the master application to obtain login information from an operator; and enabling at least one of the slave applications to seek login information from the master application and, if the login information is not available for a particular slave application, enabling the particular slave application to obtain login information under control of the master application by executing a slave login process, wherein, during the slave login process, the master application provides a login screen for display by the slave application.

13. A peripheral device configured to control login requirements of a plurality of peripheral device applications, the peripheral device comprising:

a defining unit configured to define one of the applications as a master application, with all other applications being slave applications; and a central processing unit configured to control the master application to obtain login information from an operator, and configured to enable at least one of the slave applications to seek login information from the master application, wherein, if the login information is not available for a particular slave application, the central processing unit controls the particular slave application to obtain the login information under the control of the master application by executing a slave login process, and wherein, during the slave login process, the master application provides a login screen for display by the slave application.

\* \* \* \* \*

UNITED STATES PATENT AND TRADEMARK OFFICE
CERTIFICATE OF CORRECTION

| | | |
|---|---|---|
| PATENT NO. | : 8,185,939 B2 | Page 1 of 1 |
| APPLICATION NO. | : 11/537279 | |
| DATED | : May 22, 2012 | |
| INVENTOR(S) | : Roberts et al. | |

It is certified that error appears in the above-identified patent and that said Letters Patent is hereby corrected as shown below:

On the Title page, Item (73)

Delete "Canon Europe Limited" and insert instead -- CANON EUROPA N.V. --.

Signed and Sealed this
Twenty-fourth Day of July, 2012

David J. Kappos
*Director of the United States Patent and Trademark Office*